US007788116B2

(12) United States Patent
Di Florio et al.

(10) Patent No.: US 7,788,116 B2
(45) Date of Patent: Aug. 31, 2010

(54) TRAVEL SAVINGS ASSESSMENT

(75) Inventors: Dionino Di Florio, London (GB);
Michael Parker, London (GB); Olivier Sauser, Jouabs Ponchartrain (FR)

(73) Assignee: American Express Travel Related Services Company, Inc., New York, NY (US)

( * ) Notice: Subject to any disclaimer, the term of this patent is extended or adjusted under 35 U.S.C. 154(b) by 1258 days.

(21) Appl. No.: 11/161,489

(22) Filed: Aug. 5, 2005

(65) Prior Publication Data
US 2006/0069592 A1 Mar. 30, 2006

Related U.S. Application Data

(60) Provisional application No. 60/522,411, filed on Sep. 27, 2004.

(51) Int. Cl.
*G06Q 10/00* (2006.01)
(52) U.S. Cl. .............................. 705/5; 705/1.1; 705/10
(58) Field of Classification Search .................... 705/5, 705/1.1, 10
See application file for complete search history.

(56) References Cited

U.S. PATENT DOCUMENTS

| | | | |
|---|---|---|---|
| 4,862,357 A | 8/1989 | Ahlstrom et al. |
| 4,885,685 A | 12/1989 | Wolfberg et al. |
| 5,237,499 A | 8/1993 | Garback |
| 5,253,166 A | 10/1993 | Dettelbach et al. |
| 5,331,546 A | 7/1994 | Webber et al. |
| 5,570,283 A | 10/1996 | Shoolery et al. |
| 5,576,951 A | 11/1996 | Lockwood |
| 5,644,721 A | 7/1997 | Chung et al. |
| 5,648,900 A | 7/1997 | Bowen et al. |
| 5,732,398 A | 3/1998 | Tagawa |
| 5,832,451 A | 11/1998 | Flake et al. |
| 5,832,453 A | 11/1998 | O'Brien |
| 5,832,454 A | 11/1998 | Jafri et al. |
| 5,948,040 A | 9/1999 | DeLorme et al. |
| 5,953,706 A | 9/1999 | Patel |
| 6,018,715 A | 1/2000 | Lynch et al. |
| 6,021,397 A | 2/2000 | Jones et al. |
| 6,023,679 A | 2/2000 | Acebo et al. |
| 6,119,094 A | 9/2000 | Lynch et al. |
| 6,275,808 B1 | 8/2001 | DeMarcken |
| 6,295,521 B1 | 9/2001 | DeMarcken et al. |
| 6,377,932 B1 | 4/2002 | DeMarcken |
| 6,430,542 B1 | 8/2002 | Moran |
| 6,442,526 B1 | 8/2002 | Vance et al. |
| 6,477,520 B1 | 11/2002 | Malaviya et al. |
| 6,526,387 B1 | 2/2003 | Ruffin et al. |
| 6,529,889 B1 | 3/2003 | Roberts et al. |
| 2001/0014868 A1 | 8/2001 | Herz et al. |
| 2001/0034626 A1* | 10/2001 | Gillespie .................. 705/6 |
| 2002/0087391 A1 | 7/2002 | Williams |
| 2002/0107873 A1 | 8/2002 | Winkler et al. |
| 2002/0143677 A1 | 10/2002 | Prakash |

(Continued)

*Primary Examiner*—Shannon S Saliard
(74) *Attorney, Agent, or Firm*—Snell & Wilmer L.L.P.

(57) ABSTRACT

A method and system for travel savings assessment is disclosed. The invention analyzes the total travel spend of an entity with many members, employees, or other personnel who incur travel costs using various metrics, estimates the savings that may be achieved by known or new entities, calculates and produces periodic reports that track an entity's progress towards obtaining the estimated savings, and can also estimate the potential savings of an entity.

15 Claims, 6 Drawing Sheets

U.S. PATENT DOCUMENTS

| | | |
|---|---|---|
| 2002/0143680 A1 | 10/2002 | Walters et al. |
| 2002/0184059 A1 | 12/2002 | Offutt, Jr. et al. |
| 2002/0194038 A1 | 12/2002 | Sauser et al. |
| 2003/0009368 A1* | 1/2003 | Kitts ............................ 705/10 |
| 2003/0055690 A1 | 3/2003 | Garback |
| 2003/0088481 A1 | 5/2003 | Elias |
| 2003/0110062 A1 | 6/2003 | Mogler et al. |
| 2003/0172014 A1 | 9/2003 | Quackenbush et al. |
| 2003/0187716 A1 | 10/2003 | Lee |
| 2003/0233243 A1 | 12/2003 | Officer |
| 2004/0162763 A1 | 8/2004 | Hoskin et al. |
| 2005/0055275 A1* | 3/2005 | Newman et al. ............... 705/14 |
| 2007/0021991 A1* | 1/2007 | Etzioni et al. .................. 705/5 |
| 2009/0254971 A1* | 10/2009 | Herz et al. ..................... 726/1 |

* cited by examiner

TRAVEL SAVINGS ASSESSMENT

CROSS-REFERENCE TO RELATED APPLICATIONS

This application claims the benefit of, and priority to, U.S. Provisional Application No. 60/522,411, filed Sep. 27, 2004, the entire contents of which are hereby incorporated by reference.

FIELD OF INVENTION

The present invention generally relates to analyzing travel savings.

BACKGROUND OF INVENTION

Companies and organizations typically purchase a significant amount of travel services from a number of different travel suppliers (e.g., airlines, hotels, etc.). A large entity, with offices and employees located throughout the world, often has hundreds, if not thousands, of employees traveling from one location to another as well as significant travel between office locations such as headquarters, manufacturing plants, distribution centers, and the like. Smaller entities can also have a significant concentration of spend on certain air routes or hotel locations.

Because of the high volume, consistency and frequency of travel, entities are often able to negotiate special rates and discounts by entering into contracts with travel suppliers. These contracts may save the company money. However, it is difficult to assess the potential savings of these contracts due to their often complex and non-standard nature.

SUMMARY OF INVENTION

The present invention generally relates to assessing travel savings for entities that may have many members, employees, or other personnel who incur travel expenses. The travel savings assessment system may comprise a host system, a travel agency system, a financial institution system, and a travel carrier system 160. Information may be exchanged between these separate systems via any suitable network.

A method for facilitating an assessment of travel savings may comprise creating a plurality of clusters for entities that is based on the entities' travel data such as travel spend distribution and total travel spend amount. A new entity may then be assigned to one of the clusters based on the new entity's travel data. An assessment of the travel savings for the new entity may then be made based on the assigned cluster.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps in the similar views, and.

DETAILED DESCRIPTION

Figure 1:
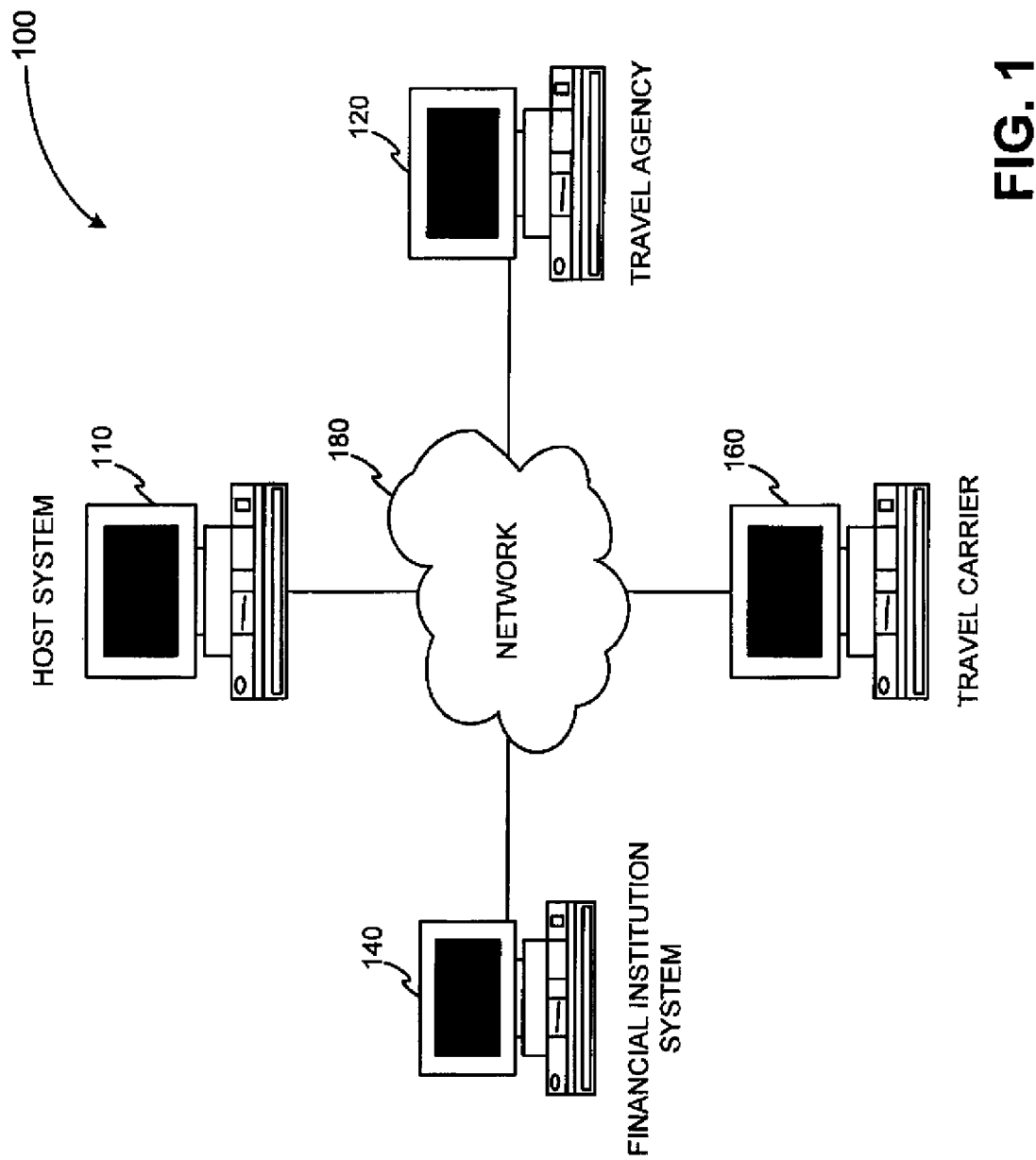
FIG. 1 is a simplified block diagram of exemplary components in accordance with one embodiment of the present invention.

The following descriptions are of exemplary embodiments of the invention, and are not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the spirit and scope of the invention. For example, the steps recited in any of the methods or processes may be executed in any order and are not limited to the order presented.

The invention is generally directed to a system and method for analyzing and tracking the savings for the travel spend of an entity with many members, employees, or other personnel who incur travel expenses. In an exemplary embodiment, the invention facilitates the processing of information in several phases, such as: (1) a data gathering and cleaning phase, where data is received from multiple travel agency sources such as travel agents, joint ventures, and other representative agencies and the received data is processed to ensure its integrity; (2) an integration phase, where data from financial card (e.g., credit card, debit card, charge card, etc.) transactions and the "cleaned" data from travel agencies is integrated in order to ensure that the maximum amount of data is analyzed; (3) a clustering phase, where entity travel data is grouped into clusters that contain similar attributes such as spend distribution and total spend amount; and (4) an analysis and report creation phase, where the system provides an estimate of the amount of savings the entity could achieve, based on assigning the entity to a cluster and performing an assessment of the actual data. The present invention will be conveniently described with reference to air fares, but a similar analysis could be performed for other types of spending, savings, travel fares (e.g., hotel rates) and the like. Moreover, the invention may be described with respect to monetary spending; however, the invention may also contemplate loyalty points, barter, donations, gifts, and the like.

In an exemplary embodiment, the clustering phase and the analysis and report creation phase are implemented through a statistical technique to group entities so as to maximize homogeneity of entities within a cluster and to maximize diversity of entities between clusters. One embodiment of the present invention updates the clusters on a periodic basis, such as every quarter, so that current data is utilized. However, the updates may occur on a random basis or any other period or not at all.

Thus, the present invention effectively and efficiently processes travel history data and other information, or any portion thereof, received from a travel agent, a financial institution, one or more travel carriers (e.g., airlines), and/or other third parties. The present invention also facilitates streamlining an entity's travel routes to create savings plans or discount packages tailored to the airline routes taken.

Figure 2:
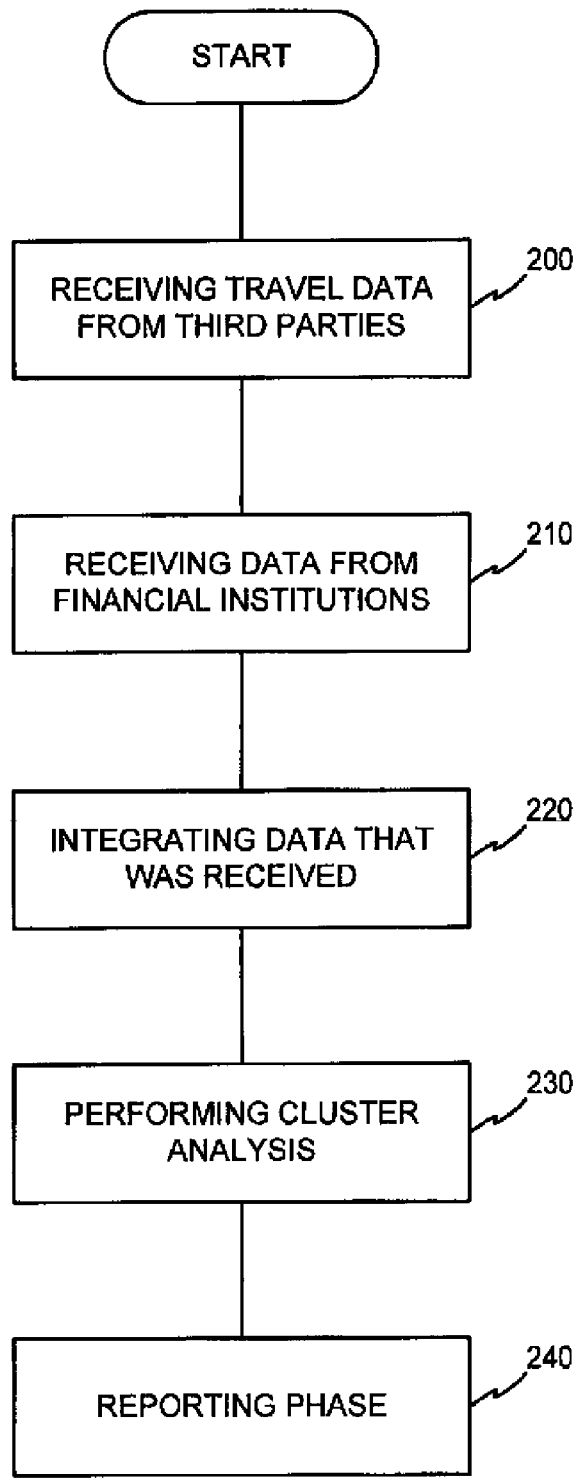
FIG. 2 is a flow chart depicting an exemplary process flow in accordance with one embodiment of the present invention.

In an exemplary embodiment, a travel savings assessment system 100, as shown in FIG. 1, comprises a host system 110, a travel agency system 120, a financial institution system 140, and a travel carrier system 160. Information may be exchanged via any suitable network 180 discussed herein or known in the art, including direct connections, distributed networks, etc. As described more fully below, data from these various sources may be imported and exported as necessary to perform the desired analysis and generate requested optimization results. With respect to exemplary processes, and by way of a general overview, an exemplary method in accordance with one embodiment of the present invention, as illustrated in FIG. 2, comprises the following steps performed by host system 110: (1) receiving travel data from third parties such as travel agencies, travel carriers and the like (STEP 200); (2) receiving data from financial institutions for travel related transactions that utilized a financial card (STEP 210); (3) integrating the received travel agency data with the data received from financial card transactions that include travel spend (STEP 220); (4) performing a statistical cluster analysis to create clusters in order to maximize homogeneity within a cluster and to maximize diversity among the clusters (STEP 230); and (5) engaging in a report generating phase (STEP 240), by assigning an entity to a cluster and evaluating, inter alia, the entity's spend distribution and comparing the entity to the highest ranked member in the entity's cluster.

It should be appreciated that host system 110 may reside with financial institution system 140, travel agency system 120, travel carrier system 160, or with any other third party. Additionally, host system 110 may exist within a single party, e.g., financial institution system 140, or may be distributed between or among several different parties. Host system 110 may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including entity data, contract data, financial institution data and/or like data that could be used in association with the present invention. As those skilled in the art will appreciate, a computer system which may be used herein will typically include an operating system (e.g., Windows NT, 95/98/2000, Linux, Solaris, etc.) as well as various conventional support software and drivers typically associated with computers. The system computer can be in a home or business environment with access to a network. In an exemplary embodiment, access is through the Internet or other distributed network through any web-browser software or other communication package.

Communication between the parties to the transaction and the system may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

A database, datamart, or data set may include any type of database, such as relational, hierarchical, object-oriented, and/or the like. Common database products that may be used to implement the databases include DB2, Microsoft Access, MSSQL, or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Host system 110 may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The system and method may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like.

"Entity," as used herein includes any software, hardware, company, organization, individual or other party which obtains goods and services from travel carriers, directly or indirectly. As the term is used herein, "entity" may refer to the customer of the financial institution, the travel agency, or the travel carrier; or any party who desires to optimize travel carrier purchases and contracting. Entities, as used herein, may include employees, vendors, contractors, joint ventures, corporate clients, local clients, international clients, regional clients, divisions of a company, customers, card holders, account holders, and the like. The entity's travel services are often negotiated and managed by travel agencies and/or their financial institution.

The "financial institution" may house the host system which receives and analyzes travel data information. Further, the "financial institution," as defined herein, includes any software, hardware, banking, credit, or other business entity that services its clients' financial and/or travel needs. As noted, the "financial institution" may also provide travel services. An example of a financial institution that also provides its clients with travel services is American Express. "Travel agency," as defined herein, includes any software, hardware, individual, entity or agency that contracts and negotiates with the travel carriers and/or others on behalf of its clients. As previously noted, it is possible for the travel agency and financial institution to be the same.

"Travel carrier" or "air carrier" as those terms are used herein includes any software, hardware, individual, entity and/or the like that provides or facilitates transportation or travel services, including airlines, bus companies, train companies, and/or the like. Although the present invention is described primarily in terms of an airline travel carrier, one skilled in the art will easily appreciate that the invention is not so limited.

"Travel data," as used herein, includes information that relates to an entity's travel needs and historical usage such as types of travel carrier tickets purchased; methods, amounts, and currencies of payment; travel service supplier; and departure and arrival locations, including any intervening stops.

A travel "segment" includes a particular airline (or other travel carrier) route between cities. For example, a flight originating in Phoenix (PHX), which stops in Dallas (DFW), in route to Baltimore (BWI) comprises two segments: namely, (1) PHX-DFW, and (2) DFW-BWI. The phrase "class of service" may also be used in the calculation of an optimal travel solution. "Class of service" includes the various types of service offered by the variety of travel carriers, e.g., first class, business class, coach class, which may be divided further by full and discounted fares. When referring to a "ticket origin," the term includes an identifier such as an International Air Transport Association (IATA) number or a currency identifying the country or origin and/or the country where the ticket was purchased. An "airport pair" includes two airports that define, for example, the point of origin and destination, or the point of origin and stop-over. For example, the segment PHX-BWI is an airport pair. "Travel spend" or simply "spend" include the amount of money spent by a particular entity for travel services.

An exemplary embodiment contemplates particular "sectors" of travel. Each sector may be multi-dimensionally defined to include the air carrier, airport pair, ticket origin and class of service. In defining each sector in this manner, the number of sectors can increase rapidly where more than 10,000 sectors may be considered in a typical computational model. This sector definition may be different from known optimization methods which have limited a "sector" to a function of only the airport pair and the air carrier code. Similar to the "sector" definition, an exemplary algorithm employed by the present invention considers functional constraints on a four-dimensional basis. For example, in accordance with one embodiment, the sum of a series of sectors defined by different airport pairs, air carriers, origins and classes of service may be required to be more than a specific number. Similarly, the global spend of a series of sectors may be required to be more than a specific amount. In this manner, the number of constraints increases rapidly, wherein a typical problem may consider more than 100,000 constraints. Although the sector definitions and mathematical algorithm definitions have described four-dimensional calculations, it should be appreciated that fewer or more constraints and parameters may be employed depending on the particular modeling objective. For example, calculations of optimal results may be based on more narrowly or broadly defined sectors and algorithms.

An exemplary algorithm, in accordance with one embodiment of the present invention, does not require that the travel fares be published at the start of the algorithm; however, published travel fares are contemplated by another embodiment of this invention. In an exemplary embodiment, a heuristic discriminant algorithm element is introduced where the travel fares are not published, but are a function of the type of fare (e.g., Domestic, European, North American, Other) and the most frequent airport pairs that are obtained from the financial card and travel agency data. In an exemplary embodiment, the weighted averages of these fares may be used as published fares, where the weights may represent the number of sectors related to the same destination.

Conversely, if the published travel fares are available, then an exemplary embodiment may utilize the published fares. This dynamic pricing structure allows the model to operate in the absence of published fares. In accordance with one embodiment of the present invention, before calculating the published fares to be used as benchmark fares, the system converts all the amounts in US dollars, and then computes average published fare and maximum published fare for each combination of four variables: (1) country of ticketing, (2) directional airport sequence, (3) air carrier and (4) class of service.

First, a match is attempted by joining card data and published fares by the same four variables above. For positively matched records, if the ticket paid amount is higher than the average published fare, then the benchmark fare is set equal to the maximum published fare. If the maximum published fare is still lower than the ticket paid fare, then the benchmark fare is set equal to the ticket amount. Similar merges are then completed on the "unmatched records", each time considering a weaker match clause. The second step processes the data in a similar manner, but with the difference that the airport sequence is non directional. The third step joins the unmatched records coming from step two with the published fares files, considers a directional airport sequence, and ignores the country of ticketing. The fourth step joins the unmatched records coming from step three with the published fares files, considers a non-directional airport sequence, and ignores the country of ticketing. Finally, the last unmatched records are kept in the final data set, setting the benchmark fare equal to the ticket amount. This dynamic pricing structure allows the model to operate in the absence of published fares, which is frequently the case.

Exemplary input data sets include entity "travel data" and are collected every time a financial card or travel transaction occurs. For new entities, "travel data" may be summarized by filling out a questionnaire or otherwise providing historical travel data.

The present invention performs the travel savings assessment by receiving, inter alia, one or more of the various input parameters described above, which relate to an entity's travel needs and historical usage. As such, the system, in accordance with one embodiment of the present invention, operates using entity information collected from one or more sources. For example, entity information may include (i) the types of travel carrier tickets purchased, (ii) methods and currencies of payment, (iii) available airline companies, (iv) geographic areas of departure and arrival, and/or the like. The host application performs a cluster analysis by utilizing cleaned up input data from travel agencies and financial card transactions. The process of cleaning includes, for example, dropping rows of travel data that contain incorrect values.

By way of general background, it should be noted that the linear and/or non-linear programming methods implemented herein use mathematical algorithms. The analytical programs are a class of problems with an objective that is a function of a set of decision variables that is to be optimized (maximized or minimized) subject to constraints on those decision variables. These problems may be categorized by the structure of the objective function and the structure of the constraints. Many applications of mathematical programs exist, ranging from simple problems (e.g., finding a minimum cost assignment of objects in one set to objects in another set) to complex problems (e.g., finding the schedules for a set of tasks that have resource requirements). The art of modeling real world situations as mathematical programs is typically called "formulating" the mathematical program or formulation. Many situations can be modeled as mathematical programs, and it is difficult to characterize all of them because, in general, these problems may be large, hard to formulate, and hard to solve. For additional background on mathematical modeling and complex solution solving, see SAS (1990-2000) "SAS/OR© User's Guide," SAS Institute, Inc., Winston, W., Operation Research, Wasworth 1998, which is incorporated herein by reference. Indeed, specialized algorithms for solving mathematical programs have been developed that exploit the structure in the problem, thereby simplifying finding a solution. The procedures that focus in this area are defined by the structure of the mathematical program that they solve.

An exemplary goal programming model utilizes an automated optimization program that is capable of facilitating linear or non-linear mathematical modelling methods, such as, for example, processing available with the Statistical Analysis System (SAS) (module SAS/OR). Although the SAS system is currently a software component known to provide suitable analytical capabilities, other analytical software solutions, known and yet to be developed, such as SPSS, STATA, MINITAB, Matlab, Mathematica and the like may be suitably employed. An exemplary system and method is capable of providing entities with an optimal strategy relating to travel savings assessments.

An exemplary system, as previously noted, comprises a processing structure which: (1) represents the entity data in a multidimensional datamart where each sector is defined by four dimensions: Air Carrier, Airport Pair, Ticket Origin and Class of Service. In this way, the number of sectors increases rapidly. Furthermore, the present invention accounts for a constraint defined on a free four-dimensional structure. Stated another way, a constraint may include the sum of a series of sectors defined by different Airport Pairs, Air Carries, Origins and Classes of Service.

Data Organization

Figure 3:
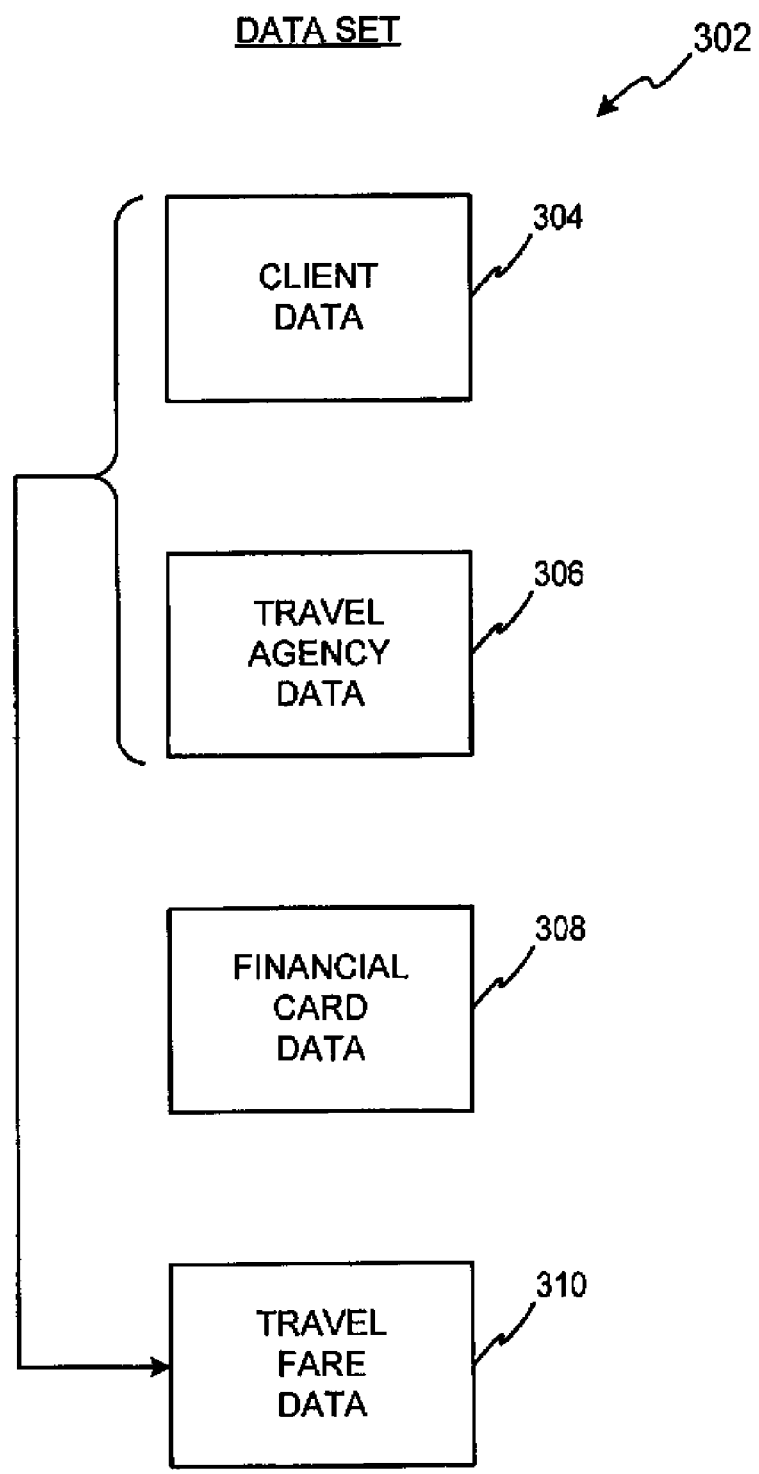
FIG. 3 is a schematic depicting an exemplary data set relationship in accordance with one embodiment of the present invention.

In an exemplary embodiment, as depicted in FIG. 3, a data structure 302 may be divided (or categorized) into four main directories: (1) an entity data directory 304 containing entity travel data; (2) a travel agency directory 306 containing travel agency data; (3) a financial card directory 308 containing data sets for financial card transactions; and (4) a travel fare directory 310 containing published or calculated travel fare data to support the savings assessment analysis.

In an exemplary travel agency directory 306, which may contain a relational database, each travel agency source may be inputted as separate data sets 302. The records in data sets 302 may be logically connected to a univocal key represented by the contract code. A contract code is an identifier that is unique to any particular travel carrier contract. Two exemplary data sets, for example, contain (1) general information about the contract and (2) information about various specific conditions for the contract. The first exemplary data set contains the general data of the contract, e.g., the contract code, the label on the contract description, the validity period of the contract and the entity code to which it refers. Another exemplary data set contains the data relating to the cost measurement indicia, such as ticket price, ticket currency, percentage of discount, etc. Other exemplary data sets can be configured to take into account: the agency International Air Transport Association (IATA) code, the air carrier code, the booking code, the tour type and the tour box information, the destination country code, the fare basis code, the ticket currency code, the eventual IATA currency country, the threshold value and the percentage of the corresponding rebate value. Although a number of travel agency data set 306 indicia are noted above, this list is not an exclusive list nor does travel agency data set 306 necessarily include every indicia listed above. Indeed, the system is configurable to take into account various programming goals and user preferences.

Travel agency directory 306 may also comprise data sets relating to, for example, data about the exchange rate for a particular country, with validity data and air ticket currency. Additional travel agency directory data may include the description of the IATA agency, data relating to country code, airport code and area of belonging, data relating to airline company description, booking code description, a data set providing booking code description per class of group on the air companies, and the area description.

Travel data is organized and aggregated by "parents." A parent is a top-level identification of an entity, which is hierarchically structured in country level aggregates and single account numbers (local level branches aggregates). Statistics at the parent level are initially computed from single issued tickets belonging to specific account numbers and grouping the flights hierarchically up to the top level.

Data Acquisition, Correction and Management

Figure 4:
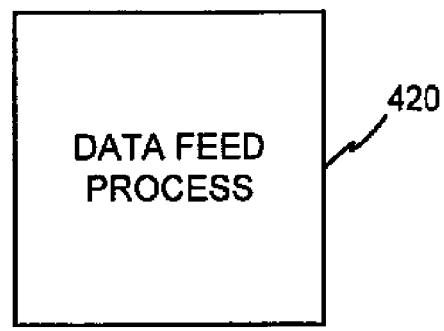
FIG. 4 depicts an overview of the exemplary three phases of data management in accordance with one embodiment of the present invention.
Figure 4:
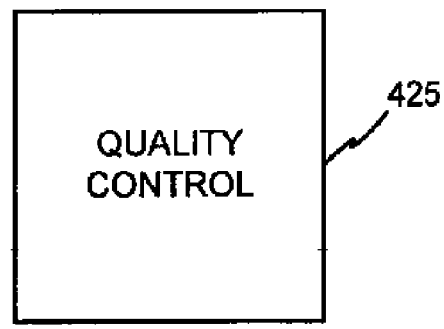
Figure 4:
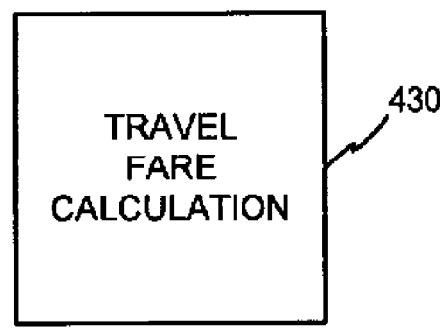

With respect to data structure 302 described above, one embodiment of the present invention includes data management devices for collecting, redistributing and correcting the data. As shown in FIG. 4, these devices facilitate three phases of data management, which may include (1) data feed (acquisition) 420, (2) cleaning or quality control/correction of data 425, and (3) travel fare calculation 430. As such, a data feed process reads data in a pre-designated format from, for example, XLS files. Data may be received from known entities wherein the travel data may be received from travel agent 120 or by financial card transaction data from financial institution 140. Data may also be received from a new entity, wherein the new entity may provide travel data by filing out a form, or by providing a data file containing detailed travel data. Entity and/or contract data may also be retrieved from sources other than those previously listed.

During the quality control phase, in an exemplary embodiment, a series of data correction and/or distribution events are carried out. For example, when imported data contains incorrect values, the transaction record containing the incorrect value may be deleted. The most common examples of incorrect values include the absence of mandatory fields such as average fares, airport pair, class code, air carrier code, and the like. Secondary examples include duplicate records. Other correction and quality control features may factor in currency origin, taxes, and/or the like. Data quality control allows the reporting of error frequency and an estimation of missing data. In an exemplary embodiment, the quality control routine may be carried out either (1) automatically at the time the data is received, or (2) manually, after the data is acquired.

Clustering Phase

Figure 5:
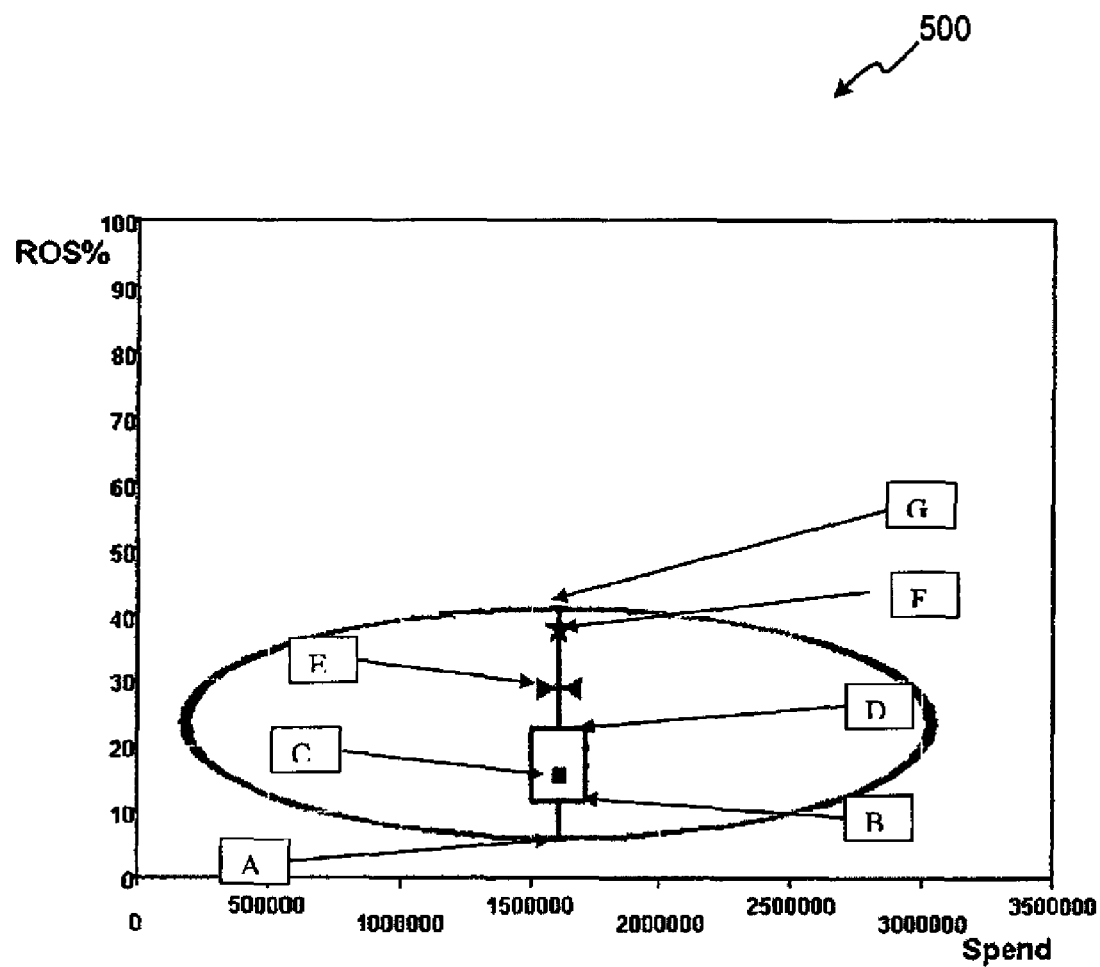
FIG. 5 is a exemplary screen shot depicting an exemplary cluster diagram in accordance with one embodiment of the present invention.

After the requisite data sets 302 (FIG. 3) have been acquired, the system performs a clustering phase, where entity data is grouped into clusters that contain similar attributes such as spend distribution and total spend amount. Statistical techniques may be used such that each cluster contains entity data within a specified statistical deviation for spend distribution and total spend amount. A repetitive process may be used to group the entity data into clusters to achieve homogeneity of entities within a cluster and to maximize diversity of entities between clusters. An exemplary cluster diagram 500 is illustrated in the screen shot depicted in FIG. 5. As such, an exemplary cluster diagram of the present invention comprises the following fields and labels, Label A refers to the minimum actual Return On Spend (ROS) among all the parents present in the cluster (ROS calculated using the published fares). The cluster considered is the same cluster the entity has been assigned to.

Label B refers to the 25th percentile which means that, if a cluster contains 100 distinct values of ROS (that is, 100 parents, each one having a different ROS), 25 of these values are below or equal to B.

Label C refers to the median ROS value: in a cluster containing 100 distinct values of ROS (that is, 100 parents, each one having a different ROS), 50 of these value are below or equal to C.

Label D refers to the 75th percentile. This means that 75 distinct values of ROS, in a cluster of 100 (that is, 100 parents, each one having a different ROS), are below or equal to D.

Label E refers to the 90th percentile. This means that, if a cluster contains 100 distinct values of ROS (that is, 100 parents, each one having a different ROS), 90 of these values are below E.

Label F refers to the Entity effective ROS: that is, the discriminate analysis assigns, to each level of spend filled, a certain Published fare, and the ROS is the ratio between the savings and the published fares.

Label G refers to the maximum ROS among all the entities present in the cluster.

The bubble is centered on the entity's spend in the X axis and on the (max ROS−min ROS)/2 in the Y axis. The size of the bubble depends on the maximum spend among the parents in the cluster.

In an exemplary embodiment, clusters may be created in a two step process corresponding to the two digits of the cluster identification number. The first number may correspond to a clusterization based on the "size" of the entity, represented by the number of sectors and the total travel spend. The second number may correspond to a clusterization based on the entity's profile, that is, the destinations of the entity's flights (e.g., domestic, Europe, North America, other) and the spend per each class of service (e.g., economy, business, first class). Entities with a very low ROS (e.g., less than 5%) and entities with a very high ROS (e.g., greater than 80%) are deleted from the analysis, as these entities are considered outliers and thus are not used for further analysis. Similarly, entities with less than a minimum number of sectors, such as 10, are not utilized to develop the clusters. The clusters may be further created by utilizing two dimensions: size (e.g., small, medium, large) and typical travel profiles (e.g., domestic, Europe, North America, other). Once the cluster has been created, the data from entities with less than the minimum number of sectors may be added into the cluster to expand the data set for the cluster.

Analysis and Report Generation

The creation of the clusters may be refreshed randomly or periodically, for example, every calendar quarter. Clusters are computed initially from existing travel data.

When a new entity desires a travel savings assessment, the new entity is assigned to the appropriate quarterly cluster structure, using a discriminate analysis. This statistical technique allows the model to assign the new entity to an existing cluster, using the same variables that have been used to produce the clusters. For example, the web page or other form that the new entity completes may request information about the new entity's total spend and the spend distribution.

Once the new entity has been assigned to a cluster, the average of the entities in the same cluster may be used to infer strategic information about the new entity, such as the potential savings and ROS achievable by the new entity.

To produce analytical reports for new entities, the system estimates its published fares. Published fares may be calculated with the following rule: utilizing the type of flight (Domestic, European, North American, Other), the model selects the most frequent airport pairs from credit card and travel agency data, and extracts related fares (from the same files). The weighted average of these fares is used as published fares, where the weights are represented by the number of sectors related to the same destination, and within the same entity's country for domestic destinations. The selection of the most frequent flights depends on the destination: for domestic destination, the country of first airport is equal to the country of the second and equal to the country selected by entity; for European, the region of the second airport has to be Europe; for North Atlantic, the region of the second airport is North America; for Other Long Haul, the region of the second airport is different from Europe and North America.

To estimate potential savings for an entity, first, the spend distribution of parents belonging to the entity's cluster are calculated, so as to determine the decile for the entity. The logic of the decile measure is the same as of percentile logic, but the distribution is divided into 10 "pieces" and not into 100, which means, for example, that the 20th percentile is equivalent to the 2nd decile. The entity's average spend may be calculated as follows, if for example, the deciles have the following limits: 0-10000, 10000-20000, 20000-30000 . . . 90000-100000 and the entity's average spend is 23000, then the entity's decile is the 3rd.

If the new entity selected one or more preferred carriers when filling in the web-page or other form, then the system calculates, per each carrier, the regression line between actual ROS (ROS of the entities in the cluster) and logarithm of the spend, and the 95% confidence interval for that line. The confidence interval provides the reasonable limits inside which values around the line are included, with a probability of 95%.

Within the decile, the entity ROS is compared with a "limit", which is the minimum value between the maximum actual ROS in the decile and the limit given by the confidence interval. This comparison is completed to avoid the influence of extreme (potential outliers) values in the actual ROS. The difference between entity's ROS and the limit is the potential ROS for the selected carriers.

When the entity selects a carrier, the entity also provides a percentage of "usage" of that carrier. An assumption is made that the entity's savings by carrier are in the same proportion of the provided spend, and with this information, the savings per each carrier can be calculated. Having the potential additional ROS, and the hypothetical published fare per carrier (which is the spend per carrier plus the savings per carrier), potential additional savings per carrier can be obtained.

Figure 6:
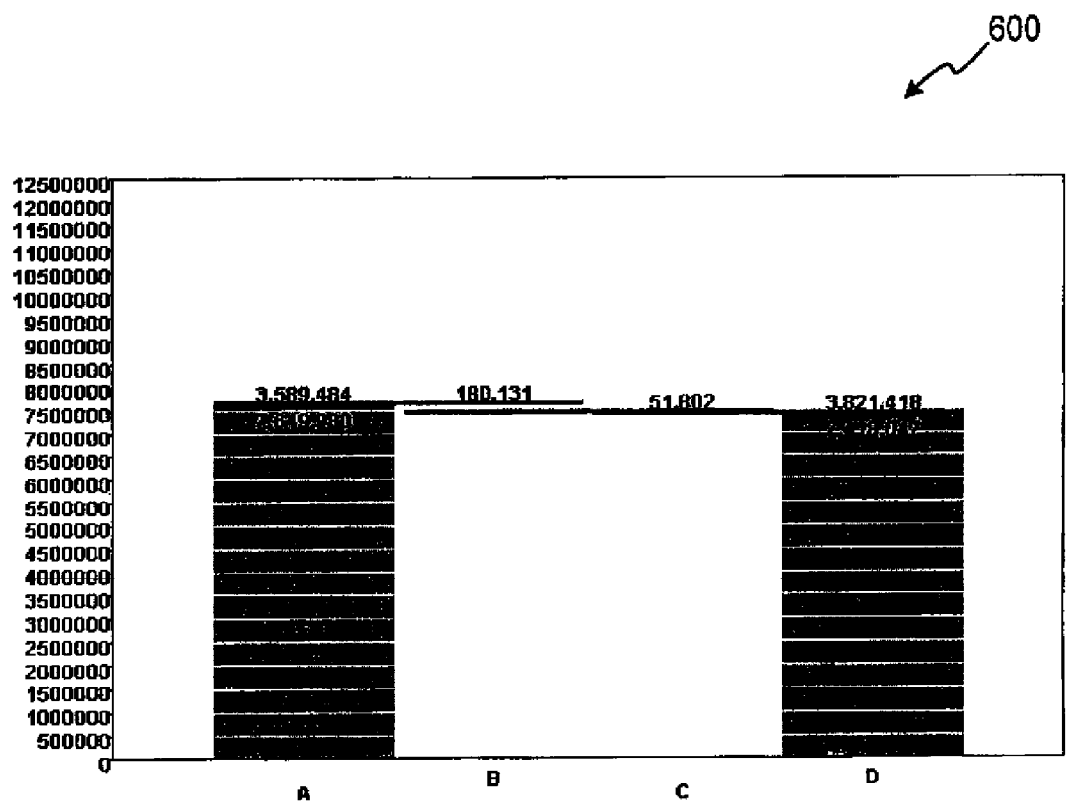
FIG. 6 is an exemplary screen shot depicting a waterfall diagram in accordance with one embodiment of the present invention.

An exemplary waterfall diagram 600 showing potential savings is illustrated in the screen shot depicted in FIG. 6. The sum of potential additional savings per carrier is the total potential savings (column B in waterfall diagram 600 reported in FIG. 6)

Column C in FIG. 6 is produced with a similar methodology, but using the other carriers that reap the greatest amount of spend inside the cluster.

Considering the sum of the potential savings in the two steps, the global potential ROS may be obtained. This potential return on spend may be limited by using the reasonable ROS in the cluster, which is the 90th percentile in the cluster.

If the new entity did not select any preferred carriers, the previous model is calculated on a representative number of best carriers (in terms of spend), such as 10, inside the entity's cluster, considering only parents flying with those carriers. The difference between the new ROS and entity's ROS is the potential ROS. Again, this final potential ROS is compared with the reasonable ROS, and, if bigger, re-proportioned. In an alternative embodiment, information may be provided as to the savings accomplished by other entities, and optionally, specific information about that entity such as name and the like, may be provided.

A travel savings assessment system and related methods may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and the like, which may carry out a variety of functions under the control of one or more microprocessors or other control devices. Similarly, the software elements of the savings asset management system and method may be implemented with any programming or scripting language such as C, C++, Java, COBOL, assembler, PERL, extensible markup language (XML), and Microsoft's Visual Studio .NET, with the various algorithms being implemented with any combination of data structures, objects, processes, routines or other programming elements. Further, it should be noted that the system 100 and methods might employ any number of conventional techniques for data transmission, signaling, data processing, network control, and the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional embodiments of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining embodiments of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to screen shots, block diagrams and flowchart illustrations of methods, apparatus (e.g., systems), and computer program products according to various embodiments of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A method for facilitating an assessment of travel savings comprising:
   creating, by a computer for facilitating said assessment of said travel savings, a plurality of multi-dimensional travel sectors based on first travel data, wherein said first travel data is related to known entities, wherein first travel data comprises historical information including air carrier, airport pair, ticket origin and service class;
   determining a size of each of said known entities, wherein size is determined as a sum of all said multi-dimensional travel sectors for each respective entity multiplied by a total travel spend for each respective entity;
   determining a destination type and a service class spend for said respective entity;
   creating a plurality of clusters based upon said first travel data, said size, said destination type and said service class spend;
   receiving, at said computer, second travel data associated with a new entity;
   assigning, at said computer, said new entity to one of said plurality of clusters based upon said second travel data to create an assigned cluster, wherein said second travel data comprises said air carrier, said airport pair, said ticket origin and said service class; and,
   estimating, by said computer, published fares based upon travel sector pairs and travel frequency, wherein said travel sector pairs and said travel frequency are associated with at least one of said first travel data, said second travel data, or said assigned cluster;
   generating, at said computer, a potential of savings (POS) for said new entity based on said assigned cluster and said published fares.

2. The method of claim 1, further comprising providing a host system for facilitating a savings assessment model.

3. The method of claim 1, further comprising receiving said first travel data related to known entities.

4. The method of claim 1, further comprising creating a travel savings assessment report for said new entity.

5. The method of claim 1, further comprising receiving said first travel data from at least one of credit card transactions, joint venturer and a travel agency.

6. The method of claim 1, further comprising cleaning said first travel data.

7. The method of claim 1, further comprising integrating said first travel data from multiple sources.

8. The method of claim 1, wherein said creating a plurality of clusters is repeated periodically.

9. The method of claim 1, further comprising deleting said first travel data prior to said creating said plurality of clusters.

10. The method of claim 1, further comprising deleting said first travel data prior to said creating said plurality of clusters, wherein said deleted travel data corresponds to said known entities who have traveled less than 10 travel segments in a year.

11. The method of claim 1, wherein said receiving second travel data includes receiving usage data for at least one travel carrier.

12. The method of claim 1, further comprising calculating a decile within said assigned cluster for said new entity.

13. The method of claim 1, wherein said new entity is a known entity.

14. A non-transitory computer-readable medium having stored thereon computer-executable instructions for facilitating an assessment of travel savings that, if executed by a computing device, cause said computing device to perform operations comprising:
   creating, by a computer, a plurality of multi-dimensional travel sectors based on first travel data, wherein said first travel data is related to known entities, wherein first travel data comprises historical information including air carrier, airport pair, ticket origin and service class;
   determining a size of each of said known entities, wherein size is determined as a sum of all said multi-dimensional travel sectors for each respective entity multiplied by a total travel spend for each respective entity;
   determining a destination type and a service class spend for said respective entity;
   creating a plurality of clusters based upon said first travel data, said size, said destination type and said service class spend;
   receiving, at said computer, second travel data associated with a new entity;
   assigning, at said computer, said new entity to one of said plurality of clusters based upon said second travel data to create an assigned cluster, wherein said second travel data comprises said air carrier, said airport pair, said ticket origin and said service class; and,
   estimating, by said computer, published fares based upon travel sector pairs and travel frequency, wherein said travel sector pairs and said travel frequency are associated with at least one of said first travel data, said second travel data, or said assigned cluster;
   generating, at said computer, a potential of savings (POS) for said new entity based on said assigned cluster and said published fares.

15. A system for facilitating an assessment of travel savings, said system comprising:
   a computer network communicating with a memory;
   said memory communicating with a processor; and
   said processor, when executing a computer program, is configured to:
      create a plurality of multi-dimensional travel sectors based on first travel data, wherein said first travel data is related to known entities, wherein first travel data comprises historical information including air carrier, airport pair, ticket origin and service class;
      determine a size of each of said known entities, wherein size is determined as a sum of all said multi-dimensional travel sectors for each respective entity multiplied by a total travel spend for each respective entity;
      determine a destination type and a service class spend for said respective entity;
      create a plurality of clusters based upon said first travel data, said size, said destination type and said service class spend;
      receive second travel data associated with a new entity;
      assign said new entity to one of said plurality of clusters based upon said second travel data to create an assigned cluster, wherein said second travel data comprises said air carrier, said airport pair, said ticket origin and said service class; and, estimate published fares based upon travel sector pairs and travel frequency, wherein said travel sector pairs and said travel frequency are associated with at least one of said first travel data, said second travel data, or said assigned cluster;

generate a potential of savings (POS) for said new entity based on said assigned cluster and said published fares.

* * * * *